(12) United States Patent
Noh et al.

(10) Patent No.: US 8,891,650 B2
(45) Date of Patent: Nov. 18, 2014

(54) METHOD FOR TRANSMITTING AND RECEIVING DOWNLINK REFERENCE SIGNALS IN A WIRELESS COMMUNICATION SYSTEM HAVING MULTIPLE ANTENNAS

(75) Inventors: Yu Jin Noh, Anyang-si (KR); Young Woo Yun, Anyang-si (KR); Dae Won Lee, Anyang-si (KR); Bong Hoe Kim, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 451 days.

(21) Appl. No.: 13/132,596

(22) PCT Filed: Dec. 3, 2009

(86) PCT No.: PCT/KR2009/007182
§ 371 (c)(1),
(2), (4) Date: Jun. 2, 2011

(87) PCT Pub. No.: WO2010/064854
PCT Pub. Date: Jun. 10, 2010

(65) Prior Publication Data
US 2011/0235730 A1 Sep. 29, 2011

Related U.S. Application Data

(60) Provisional application No. 61/119,385, filed on Dec. 3, 2008.

(30) Foreign Application Priority Data

Apr. 16, 2009 (KR) ........................ 10-2009-0032998

(51) Int. Cl.
*H04B 7/02* (2006.01)
*H04L 1/02* (2006.01)
*H04B 7/06* (2006.01)
*H04L 5/00* (2006.01)
*H04W 52/34* (2009.01)

(52) U.S. Cl.
CPC ............ *H04B 7/0617* (2013.01); *H04L 5/0048* (2013.01); *H04W 52/34* (2013.01)

USPC ........................................... 375/267

(58) Field of Classification Search
USPC ........................................... 375/267
See application file for complete search history.

(56) References Cited

U.S. PATENT DOCUMENTS

| | | | | |
|---|---|---|---|---|
| 2008/0260062 A1* | 10/2008 | Imamura | ......................... | 375/267 |
| 2010/0026560 A1* | 2/2010 | Xia et al. | ......................... | 342/173 |
| 2010/0103906 A1* | 4/2010 | Montojo et al. | .............. | 370/335 |

FOREIGN PATENT DOCUMENTS

| | | |
|---|---|---|
| KR | 1020000039423 | 7/2000 |
| KR | 1020000047620 | 7/2000 |
| KR | 1020030030640 | 4/2003 |

*Primary Examiner* — Tanmay Shah
(74) *Attorney, Agent, or Firm* — Lee, Hong, Degerman, Kang & Waimey

(57) ABSTRACT

A method for transmitting and receiving downlink Reference Signals (RSs) in a wireless communication system using multiple antennas is disclosed. The downlink RS transmission method includes transmitting a first Orthogonal Frequency Division Multiplexing (OFDM) symbol in which RSs for a plurality of antenna port of first group are allocated in a predetermined order along a frequency axis, RSs for a plurality of antenna port of second group are allocated in a predetermined order along the frequency axis, and the RSs for the plurality of antenna port of first group are multiplexed in Code Division Multiplexing (CDM) with the RSs for the plurality of antenna port of second group by pairing each of the plurality of antenna port of first group with one of the plurality of antenna port of second group, and transmitting a second OFDM symbol in which the RSs for the plurality of antenna port of first group and the RSs for the plurality of antenna port of second group are positioned in an RS pattern being a frequency-domain shift of an RS pattern of the first OFDM symbol.

5 Claims, 9 Drawing Sheets

[D] POSITIONS OF DM-DRS'S FOR FIRST TO FOURTH TX ANTENNAS

[D] POSITIONS OF DM-DRS'S FOR FOURTH TO EIGHTH TX ANTENNAS

METHOD FOR TRANSMITTING AND RECEIVING DOWNLINK REFERENCE SIGNALS IN A WIRELESS COMMUNICATION SYSTEM HAVING MULTIPLE ANTENNAS

CROSS-REFERENCE TO RELATED APPLICATIONS

This application is the National Stage filing under 35 U.S.C. 371 of International Application No. PCT/KR2009/007182, filed on Dec. 3, 2009, which claims the benefit of earlier filing date and right of priority to Korean Application No. 10-2009-0032998, filed on Apr. 16, 2009, and also claims the benefit of U.S. Provisional Application Ser. No. 61/119,385, filed on Dec. 3, 2008, the contents of all of which are incorporated by reference herein in their entireties.

TECHNICAL FIELD

The present invention relates to a wireless communication system, and more particularly, to a method for transmitting and receiving downlink reference signals in a wireless communication system.

BACKGROUND ART

Beyond the conventional use of a single Transmission (Tx) antenna and a single Reception (Rx) antenna, Multiple Input Multiple Output (MIMO) is a communication technology using a plurality of Tx antennas and a plurality of Rx antennas, with the aim to increase the transmission and reception efficiency of data.

When it uses a single antenna, a receiver receives data from a single antenna path. However, when it uses multiple antennas, the receiver receives data from different paths and combines them, thereby achieving whole data. Thus MIMO may increase data rate and transmission capacity and improve the performance of a wireless communication system. In this context, MIMO is considered as a promising future-generation communication technology that can overcome the limit of mobile communication transmission capacity that has been reached due to the recent growth of data communication.

Figure 1:
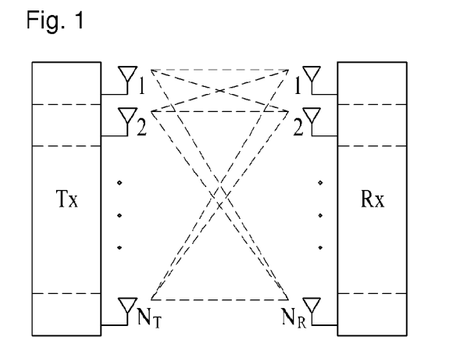
FIG. 1 illustrates channels between multiple Transmission (Tx) antennas and multiple Reception (Rx) antennas in a Multiple Input Multiple Output (MIMO) system.

FIG. 1 illustrates channels between multiple Tx antennas and multiple Rx antennas in a MIMO wireless communication system.

Referring to FIG. 1, use of a plurality of Tx antennas and a plurality of Rx antennas at both a transmitter and a receiver increases a channel transmission capacity in proportion to the number of antennas, compared to use of a plurality of antennas at only one of the transmitter and the receiver. Therefore, transmission rate and frequency efficiency are remarkably increased.

The transmission rate increases with the channel transmission capacity. A theoretical transmission rate increase rate Ri may be calculated by [Equation 1].

$$Ri = \min(NT, NR)$$

where NT denotes the number of Tx antennas and NR denotes the number of Rx antennas.

Given a maximum transmission rate Ro that may be achieved in case of a single antenna, a transmission rate RoRi can be achieved in theory in case of multiple antennas.

For instance, a wireless communication system with four Tx antennas and four Rx antennas may achieve a four-fold increase in transmission rate theoretically, relative to a single-antenna wireless communication system.

Since the theoretical capacity increase of the MIMO wireless communication system was proved, many techniques have been actively studied to increase data rate in real implementation. Some of the techniques have already been reflected in various wireless communication standards including standards for 3rd Generation (3G) mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

A MIMO wireless communication with NT Tx antennas and NR Rx antennas is mathematically modeled as follows.

Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmit power may be applied to each piece of transmission information. Let the transmit power levels of the transmission information be denoted by $P_1, P_2, \ldots, P_{N_T}$, respectively. Then the transmit power-controlled transmission information vector may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmit power-controlled transmission information vector may be expressed as a diagonal matrix P of transmit power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals are generating by multiplying the transmit power-controlled information vector by a weight matrix W. The weight matrix W functions to appropriately distribute the transmission information to the Tx antennas according to transmission channel statuses, etc. The weight matrix W is also called a precoding matrix.

These $N_T$ transmitted signals $x_1, x_2, \ldots, x_{N_T}$ are represented as a vector x, which may be determined as $$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \quad \text{[Equation 5]}$$

$$= W\hat{s} = WPs$$

where $w_{ij}$ denotes a weight for a $j^{th}$ piece of information $\hat{s}_j$ transmitted through an $i^{th}$ Tx antenna.

Given $N_R$ Rx antennas, signals received at the Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO wireless communication system, they may be distinguished according to the indexes of Tx and Rx antennas. A channel between a $j^{th}$ Tx antenna and an $i^{th}$ Rx antenna is represented as $h_{ij}$. These channels between the Tx antennas and the Rx antennas may be expressed as vectors or a matrix by grouping.

Figure 2:
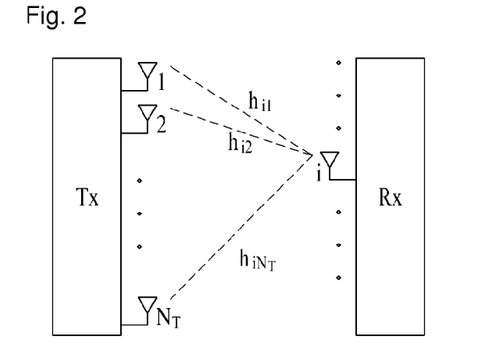
FIG. 2 illustrates channels from NT Tx antennas to an ith Rx antenna.

FIG. 2 illustrates channels from $N_T$ Tx antennas to an $i^{th}$ Rx antenna.

Referring to FIG. 2, the channels from the $N_T$ Tx antennas to the $i^{th}$ Rx antenna may be expressed as [Equation 7].

$$h_i^T = [h_{i1}, h_{i2}, \ldots, h_{iN_T}] \quad \text{[Equation 7]}$$

Hence, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

Actual channels experience the above channel matrix H and then are added with

Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal vector is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2H_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} \quad \text{[Equation 10]}$$

$$= Hx + n$$

Now a description will be made of Reference Signals (RSs).

In the wireless communication system, a packet is transmitted on a radio channel. In view of the nature of the radio channel, the packet may be distorted during the transmission. To receive the signal successfully, the receiver should compensate for the distortion in the received signal using channel information. Generally, to enable the receiver to acquire the channel information, the transmitter transmits a signal known to both the transmitter and the receiver and the receiver acquires knowledge of channel information based on the distortion of the signal received on the radio channel. This signal is called a pilot signal or an RS.

In case of data transmission and reception through multiple antennas, knowledge of channel states between Tx antennas and Rx antennas is required for successful signal reception. Accordingly, an RS should exist for each Tx antenna.

According to the purposes that they serve, RSs are categorized into four types as listed in Table 1, Channel Quality Indicator-Common Reference Signal (CQI-CRS), Demodulation-Common Reference Signal (DM-CRS), Non-precoded Demodulation-Dedicated Reference Signal (NDM-DRS), and Precoded Demodulation-Dedicated Reference Signal (PDM-DRS). As their appellations imply, a CRS is an RS common to all UEs and a DRS is an RS dedicated to a specific UE. NDM-DRS and PDM-DRS are collectively referred to as "DM-DRS".

TABLE 1

| RS Types | Notes |
|---|---|
| CQI-CRS | A common reference signal used for channel measurement. The UE determines a CQI, a Precoding Matrix Indicator (PMI), and a Rank Indicator (RI) based on CQI-CRSs. Thus, preferably, CQI-CRSs are uniformly distributed across a total frequency band. |
| DM-CRS | Although a DM-CRS is a common reference signal used for demodulation, it can be also used for channel measurement. Because a plurality of UEs use DM-CRSs for channel measurement, a precoding scheme for a specific UE cannot be applied to the DM-CRSs. Thus, when a transmitter precodes a Physical Downlink Shared CHannel (PDSCH), it needs to signal a used precoding matrix on a Physical Downlink Control CHannel (PDCCH) to a receiver. |
| NDM-DRS | A non-precoded dedicated reference signal used for demodulation. |
| PDM-DRS | A precoded dedicated reference signal used for modulation. The same precoding scheme is applied to the PDM-DRS and the PDSCH. Thus there is no need for signaling a used codebook on the PDCCH. |

Figure 3:
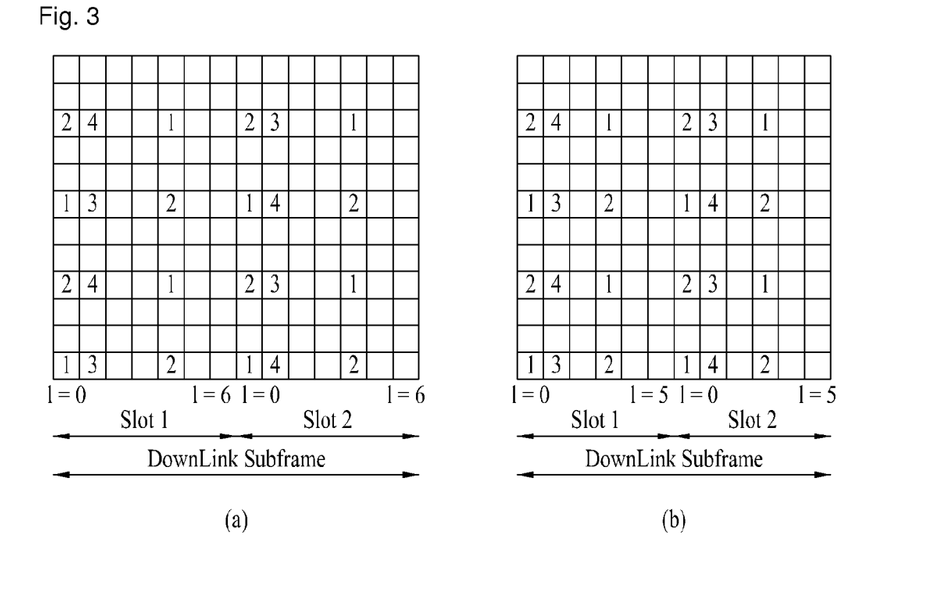
FIG. 3(a) illustrates a conventional Reference Signal (RS) allocation structure in a subframe in a wireless communication system using a normal Cyclic Prefix (CP).
FIG. 3(b) illustrates a conventional RS allocation structure in a subframe in a wireless communication system using an extended CP.

An RS is transmitted in a specific time-frequency area of a subframe. With reference to FIGS. 3(a) and 3(b), conventional RS allocation structures will be described below.

FIG. 3(a) illustrates a conventional RS allocation structure in a subframe in a wireless communication system using a normal Cyclic Prefix (CP), and FIG. 3(b) illustrates a conventional RS allocation structure in a subframe in a wireless communication system using an extended CP.

Both the conventional RS allocation structures illustrated in FIGS. 3(a) and 3(b) are designed for four Tx antenna ports. In FIGS. 3(a) and 3(b), the horizontal axis represents time and the vertical axis represents frequency. RSs allocated to the subframes are all CRSs for use in channel measurement and demodulation. Referring to FIGS. 3(a) and 3(b), one subframe includes two slots. Each slot has seven Orthogonal Frequency Division Multiplexing (OFDM) symbols in the wireless communication system using the normal CP, whereas each slot includes six OFDM symbols in the wireless communication system using the extended CP. The extended CP is used generally under a long-delay environment.

In the illustrated cases of FIGS. 3(a) and 3(b), RSs are allocated on a Resource Block (RB) basis. An RB is a set of resource elements each being a resource allocation unit having one subcarrier by one OFDM symbol.

In FIGS. 3(a) and 3(b), reference characters 1, 2, 3 and 4 denote resource elements to which RSs for first to fourth Tx antenna ports are allocated, respectively.

The conventional wireless communications support four Tx antenna ports. Therefore, RSs for the four Tx antenna ports are allocated in the conventional RS allocation structures of FIGS. 3(a) and 3(b). However, in anticipation of a future wireless communication system adopting more Tx antenna ports, there is a need for a method for transmitting RSs for five or more Tx antenna ports.

DISCLOSURE OF INVENTION

Technical Problem

An object of the present invention devised to solve the problem lies on a method for efficiently transmitting downlink RSs through multiple antenna ports in a wireless communication system.

Another object of the present invention devised to solve the problem lies on a method for transmitting downlink RSs, which enables efficient use of time-frequency resources in a wireless communication system.

It will be appreciated by persons skilled in the art that that the objects that could be achieved with the present invention are not limited to what has been particularly described hereinabove and the above and other objects that the present invention could achieve will be more clearly understood from the following detailed description taken in conjunction with the accompanying drawings.

Technical Solution

The object of the present invention can be achieved by providing a method for transmitting downlink Reference Signals (RSs) in a base station in a multi-antenna wireless communication system, including transmitting a first OFDM symbol in which RSs for a plurality of antenna port of first group are allocated in a predetermined order along a frequency axis, RSs for a plurality of antenna port of second group are allocated in a predetermined order along the frequency axis, and the RSs for the first plurality of antenna port of first group are multiplexed in Code Division Multiplexing (CDM) with the RSs for the plurality of antenna port of second group by pairing each of the plurality of antenna port of first group with one of the plurality of antenna port of second group, and transmitting a second OFDM symbol in which the RSs for the plurality of antenna port of first group and the RSs for the plurality of antenna port of second group are positioned in an RS pattern being a frequency-domain shift of an RS pattern of the first OFDM symbol.

In another aspect of the present invention, provided herein is a method for transmitting downlink RSs in a base station in a multi-antenna wireless communication system, including transmitting a first OFDM symbol in which demodulation RSs for a plurality of antenna port of first group are allocated in a predetermined order along a frequency axis, and transmitting a second OFDM symbol in which demodulation RSs for a plurality of antenna port of second group are allocated in CDM.

In another aspect of the present invention, provided herein is a method for transmitting downlink RSs in a base station in a multi-antenna wireless communication system, including transmitting a primary subframe including a first OFDM symbol in which common RSs for a plurality of antenna port of first group are allocated in a predetermined order along a frequency axis, and a second OFDM symbol in which demodulation-dedicated RSs for a plurality of antenna port of second group are multiplexed in CDM, while transmitting a secondary subframe including a third OFDM symbol in which common RSs for the plurality of antenna port of second group are allocated in a predetermined order along the frequency axis, and a fourth OFDM symbol in which demodulation-dedicated RSs for the plurality of antenna port of first group are multiplexed in CDM.

The primary subframe may further include a fifth OFDM symbol in which demodulation-dedicated RSs for the first plurality of antenna port of first group are allocated in CDM, and the secondary subframe may further include a sixth OFDM symbol in which demodulation-dedicated RSs for the plurality of antenna port of second group are allocated in CDM.

In a further aspect of the present invention, provided herein is a method for transmitting downlink RSs in a base station in a multi-antenna wireless communication system, including transmitting a primary subframe including a first OFDM symbol in which common RSs for a plurality of antenna port of first group are allocated in a predetermined order along a frequency axis, and a second OFDM symbol in which demodulation-dedicated RSs for a plurality of antenna port of second group are multiplexed in Frequency Division Multiplexing (FDM), while transmitting a secondary subframe including a third OFDM symbol in which common RSs for the plurality of antenna port of second group are allocated in a predetermined order along the frequency axis, and a fourth OFDM symbol in which demodulation-dedicated RSs for the plurality of antenna port of first group are multiplexed in FDM.

The primary subframe may be accessible to both a Long Term Evolution (LTE) UE and a Long Term Evolution-Advanced (LTE-A) UE and the secondary subframe may be accessible only to the LTE-A UE.

Advantageous Effects

Exemplary embodiments of the present invention have the following effects.

Downlink RSs can be transmitted efficiently through multiple antennas, since CRSs and DRSs are transmitted in combination.

RSs are transmitted in Code Division Multiplexing (CDM). Thus time-frequency resources are efficiently utilized.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Now, the above and other aspects of the present invention will be described in detail through preferred embodiments with reference to the accompanying drawings so that the present invention can be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims. In the following description of the present invention, a detailed description of known functions and configurations incorporated herein will be omitted when it may obscure the subject matter of the present invention. The same reference numbers will be used throughout this specification to refer to the same or like parts.

Through the specification, when it is said that some part "includes" a specific element, this means that the part may further include other elements, not excluding them, unless otherwise mentioned. The term "-er(or)", "module", "portion" or "part" is used to signify a unit of performing at least one function or operation. The unit can be realized in hardware, software, or in combination of both.

To allocate Reference Signals (RSs) to a subframe, the following considerations should be made.

One consideration is the subcarrier spacing between RSs configured for a Tx antenna port. Only if the RS subcarrier spacing is equal to or less than a threshold, a User Equipment (UE) is able to perform channel estimation. For example, the subcarrier spacing between RSs for a first Transmission (Tx) antenna port and the subcarrier spacing between RSs for a second Tx antenna port are 6 in one Orthogonal Frequency Division Multiplexing (OFDM) symbol, but they are 3 in one slot in the conventional RS allocation structures illustrated in FIGS. 3(a) and 3(b).

The relationship between the subcarrier spacing between RSs for a Tx antenna port and the channel estimation capability of the UE will be described.

If a sequence $x[i] = \{x_0, x_1, x_2, \ldots, x_{N-1}\}$ is subjected to Inverse Fast Fourier T (IFFT), $$X[k] = \sum_{i=0}^{N-1} x[i] \cdot e^{j2\pi k \frac{i}{N}}, \quad k = 0, 1, \ldots, N-1 \qquad \text{[Equation 11]}$$

On the assumption that the sequence $x[i]$ is an RS sequence for a Tx antenna port, RSs are transmitted at a uniform interval along the frequency axis. Thus, when zeros are filled at the subcarriers between RSs, the resulting transmission sequence is expressed as $y[m] = \{x_0, 0, 0, \ldots, 0, x_1, 0, 0, \ldots, 0, x_2, \ldots, x_{N-1}, 0, 0, \ldots, 0\}$. The number of zeroes interposed between RSs $x_n$ and $x_{n+1}$ is 'the RS subcarrier spacing for the Tx antenna port-1'. For example, if an RS subcarrier spacing for a Tx antenna port is 6 in one OFDM symbol as illustrated in FIG. 3(a), five zeros are filled between RSs.

The following relationship is established between the sequences $x[i]$ and $y[m]$.

$$y[m] = x[i], \ m=(Z+1)i, \ i=0,1,\ldots,N-1 \qquad \text{[Equation 12]}$$

$y[m] = 0$, otherwise where Z is the number of zeroes interposed between RS $x_n$ and RS $x_{n+1}$.

The sequence $y[m]$ is IFFT-processed to $$Y[k] = \sum_{m=0}^{N(Z+1)-1} y[m] \cdot e^{j2\pi k \frac{m}{N(Z+1)}}, \qquad \text{[Equation 13]}$$

$$k = 0, 1, \ldots, N(Z+1) - 1$$

From [Equation 11], [Equation 12] and [Equation 13], it is noted that the signals X[k] and Y[k] are in the relationship expressed as [Equation 14] which shows that the signal Y[k] is a signal with (Z+1) occurrences of the signal X[k]. In other words, the signal X[k] occurs repeatedly (Z+1) times in the signal Y[k]. For example, if an RS subcarrier spacing for a Tx antenna port is 6 in one OFDM symbol as illustrated in FIG. 3(a), the signal Y[k] has six occurrences of the signal X[k].

$$Y[k]=\{X[0],X[1], \ldots X[N-1], \ldots X[0],X[1], \ldots X[N-1]\}$$ [Equation 14]

Figure 4:
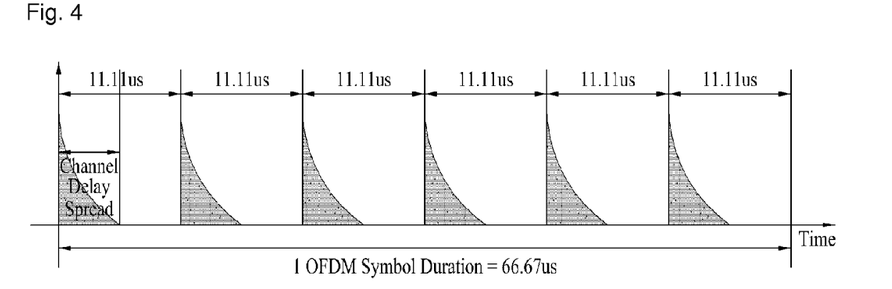
FIG. 4 illustrates symbol outputs over time when the subcarrier spacing between RSs is 6 in case of the normal CP.
Figure 5:
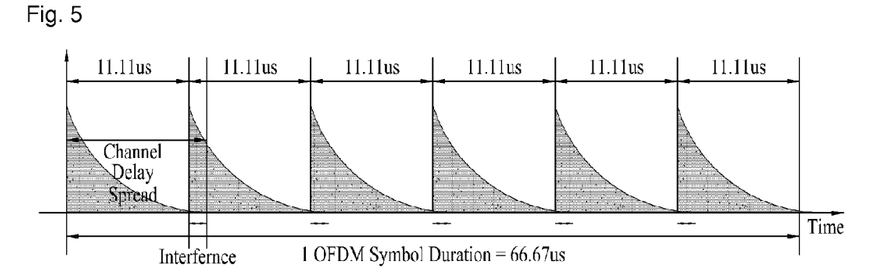
FIG. 5 illustrates symbol outputs over time when the subcarrier spacing between RSs is 6 in case of the extended CP.

FIG. 4 illustrates symbol outputs over time when the subcarrier spacing between RSs is 6 in case of the normal CP, and FIG. 5 illustrates symbol outputs over time when the subcarrier spacing between RSs is 6 in case of the extended CP. It is noted from FIGS. 4 and 5 that the same signal occurs six times in one OFDM symbol duration.

When a wireless communication system uses a frequency bandwidth of 20 MHz, one symbol includes 2048 samples and lasts 66.67-s. In case of the normal CP, the CP occupies 160 samples in the first one of seven OFDM symbols in a slot and 140 samples in each of the other six symbols. This means that the first symbol and the other symbols may cover channel delay spreads of 5.2-s and 4.69-s, respectively. On the other hand, in case of the extended CP, each of six symbols included in a slot occupies 512 samples, thus covering a channel delay spread of 16.67-s. That is, the normal CP is used under the assumption that the channel delay spread does not exceed 5.2-s or 4.69-s, whereas the extended CP is used under the assumption that the channel delay spread does not exceed 16.67-s.

Referring to FIGS. 4 and 5, the symbol duration is 66.67-s and thus the spacing between RSs for a Tx antenna is 11.11-s. As the use of the normal CP in FIG. 4 is based on the premise that the channel delay spread does not exceed 5.2-s or 4.69-s, the channel delay spread is shorter than the spacing between RSs, causing no interference between the RSs. Thus a received signal can be recovered. However, when the extended CP is used as illustrated in FIG. 5, the channel delay spread may be up to 16.67-s. Therefore, when the channel delay spread is longer than the spacing between RSs, interference may exist between the RSs.

In summary, a received signal may be recovered if the channel delay spread of RSs is shorter than the spacing between the RSs.

Figure 6:
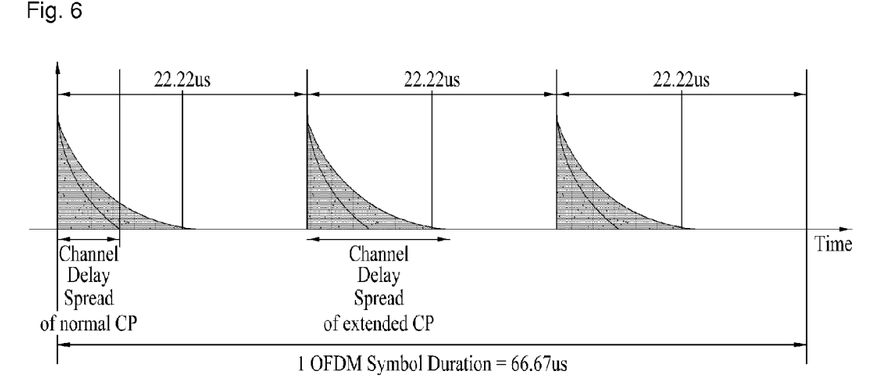
FIG. 6 illustrates symbol outputs over time when the subcarrier spacing between RSs is 3.

FIG. 6 illustrates symbol outputs over time when the subcarrier spacing between RSs is 3. Referring to FIG. 6, if an RS subcarrier spacing is 3, which means RSs are apart from each other by 22.22-s, no interference occurs between RSs either in case of the normal CP or in case of the extended CP. Accordingly, a received signal may be recovered in both cases.

As noted from FIGS. 4, 5 and 6, as the subcarrier spacing between RSs is smaller, the RSs are farther from each other in the time domain in the IFFT signal of the RS sequence, thus making signal recovery possible.

Another consideration to be made in allocating RSs to a subframe is a time-domain cyclic delay when RSs for a plurality of Tx antennas are transmitted in Code Division Multiplexing (CDM).

CDM is the process of multiplying a plurality of signals by different codes to transmit the signals in one time-frequency area.

$$X[k] = \sum_{i=0}^{N-1} x[i] \cdot e^{j2\pi k \frac{i}{N}}, \quad k = 0, 1, \ldots, N-1$$ [Equation 15]

-continued
$$X'[k'] = \sum_{i=0}^{N-1} x[i] \cdot e^{j2\pi \frac{u}{M}i} \cdot e^{j2\pi k' \frac{i}{N}} = \sum_{i=0}^{N-1} x[i] \cdot e^{j2\pi\left(\frac{k'+uZ}{N}\right)i},$$

$$N = MZ, \quad k' = 0, 1, \ldots, N-1$$

$$X'[(k - uZ) \bmod N] = X[k]$$

where X[k] is the IFFT signal of a sequence $x[i]=\{x_0, x_1, x_2, \ldots, x_{N-1}\}$ and [k] is the IFFT signal of a sequence obtained by multiplying the sequence x[i] by a code having $$e^{j2\pi \frac{u}{M}i}$$

as its elements. [Equation 15] tells that multiplication of a sequence by a specific code in the frequency domain leads to a cyclic delay of the sequence in the time domain.

Figure 7:
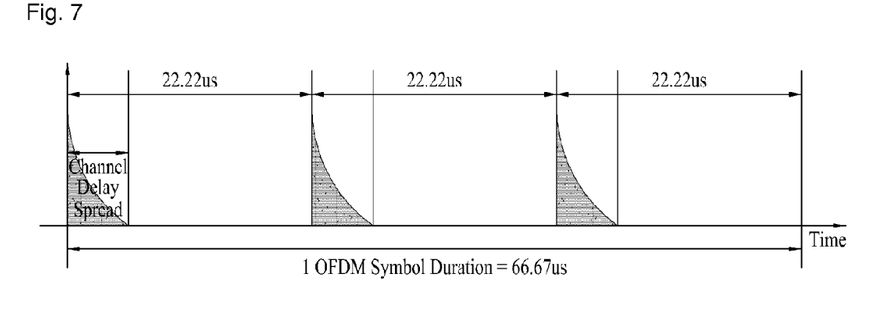
FIG. 7 illustrates symbol outputs over time when RSs for a first Tx antenna have a subcarrier spacing of 3.

FIG. 7 illustrates symbol outputs over time when RSs for a first Tx antenna have a subcarrier spacing of 3. Referring to FIG. 7, if RSs for a second Tx antenna are interposed between RSs for the first Tx antenna, the RSs for the first Tx antenna may be transmitted in CDM with the RSs for the second Tx antenna. For the CDM transmission, an RS sequence for the second Tx antenna may be multiplied by a predetermined code in the frequency domain, so that the RS sequence is cyclically shifted in the time domain and thus interposed into the RS sequence for the first Tx antenna.

A description will now be made of methods for transmitting downlink RSs in a wireless communication system according to exemplary embodiments of the present invention, with reference to FIGS. 8 to 14. The following description of the exemplary embodiments of the present invention is made in the context of eight Tx antennas, which should not be construed as limiting the present invention.

FIGS. 8 to 14 illustrate RS allocation structures designed on an RB basis. In FIGS. 8 to 14, the horizontal axis represents time and the vertical axis represents frequency. Reference character 1 denotes resource elements to which RSs for a first Tx antenna port are allocated. Reference character 2 denotes resource elements to which RSs for a second Tx antenna port are allocated. Reference character 3 denotes resource elements to which RSs for a third Tx antenna port are allocated. Reference character 4 denotes resource elements to which RSs for a fourth Tx antenna port are allocated. Reference character 5 denotes resource elements to which RSs for a fifth Tx antenna port are allocated. Reference character 6 denotes resource elements to which RSs for a sixth Tx antenna port are allocated. Reference character 7 denotes resource elements to which RSs for a seventh Tx antenna port are allocated. Reference character 8 denotes resource elements to which RSs for an eighth Tx antenna port are allocated.

In a MIMO wireless communication system, an RS should be transmitted for each Tx antenna port. RSs for a plurality of Tx antennas port may be transmitted in Frequency Division Multiplexing (FDM), Time Division Multiplexing (TDM) or CDM.

Figure 8:
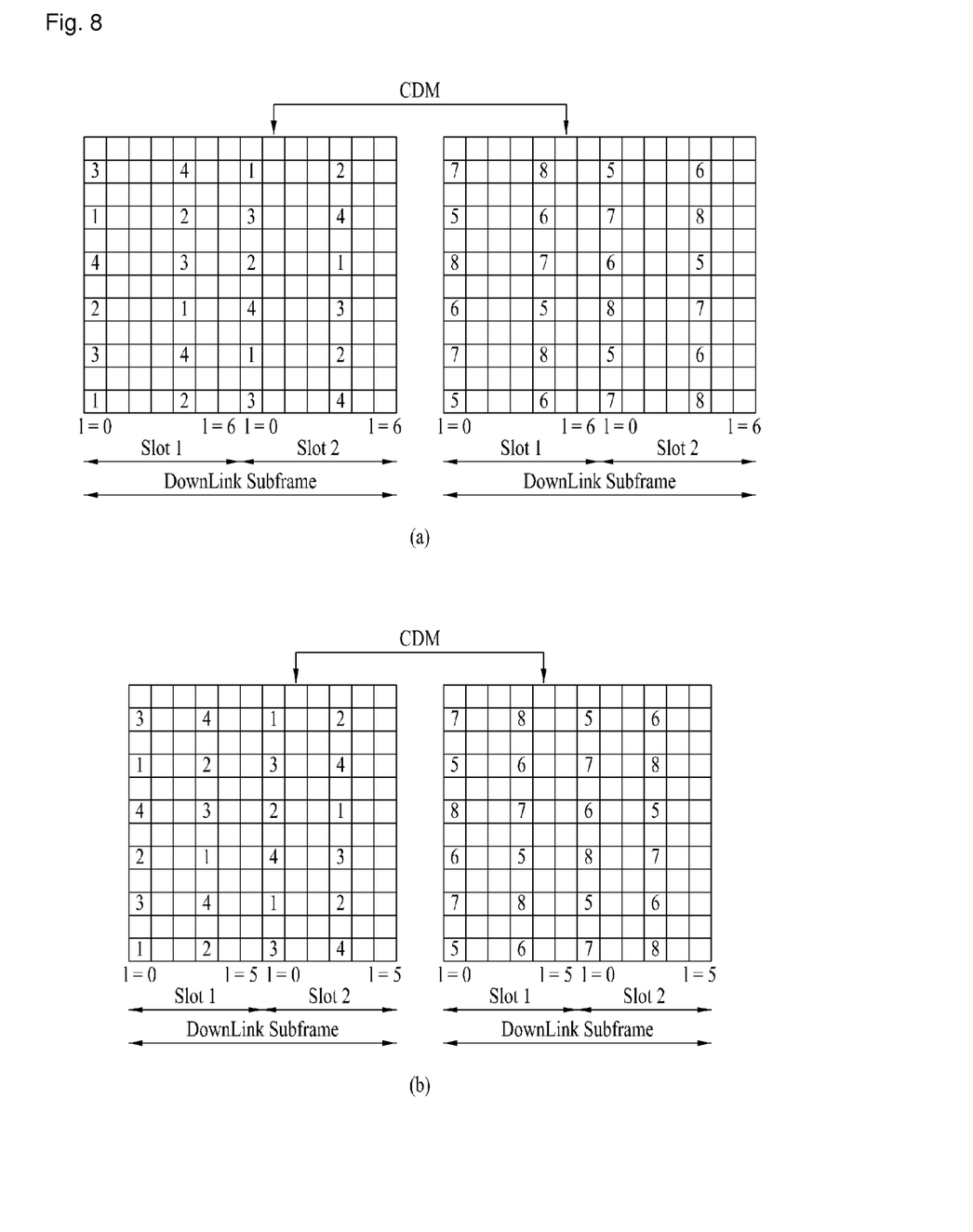
FIG. 8(a) illustrates a subframe in which RSs are allocated in the wireless communication system using the normal CP according to an exemplary embodiment of the present invention.
FIG. 8(b) illustrates a subframe in which RSs are allocated in the wireless communication system using the extended CP according to the exemplary embodiment of the present invention.
Figure 9:
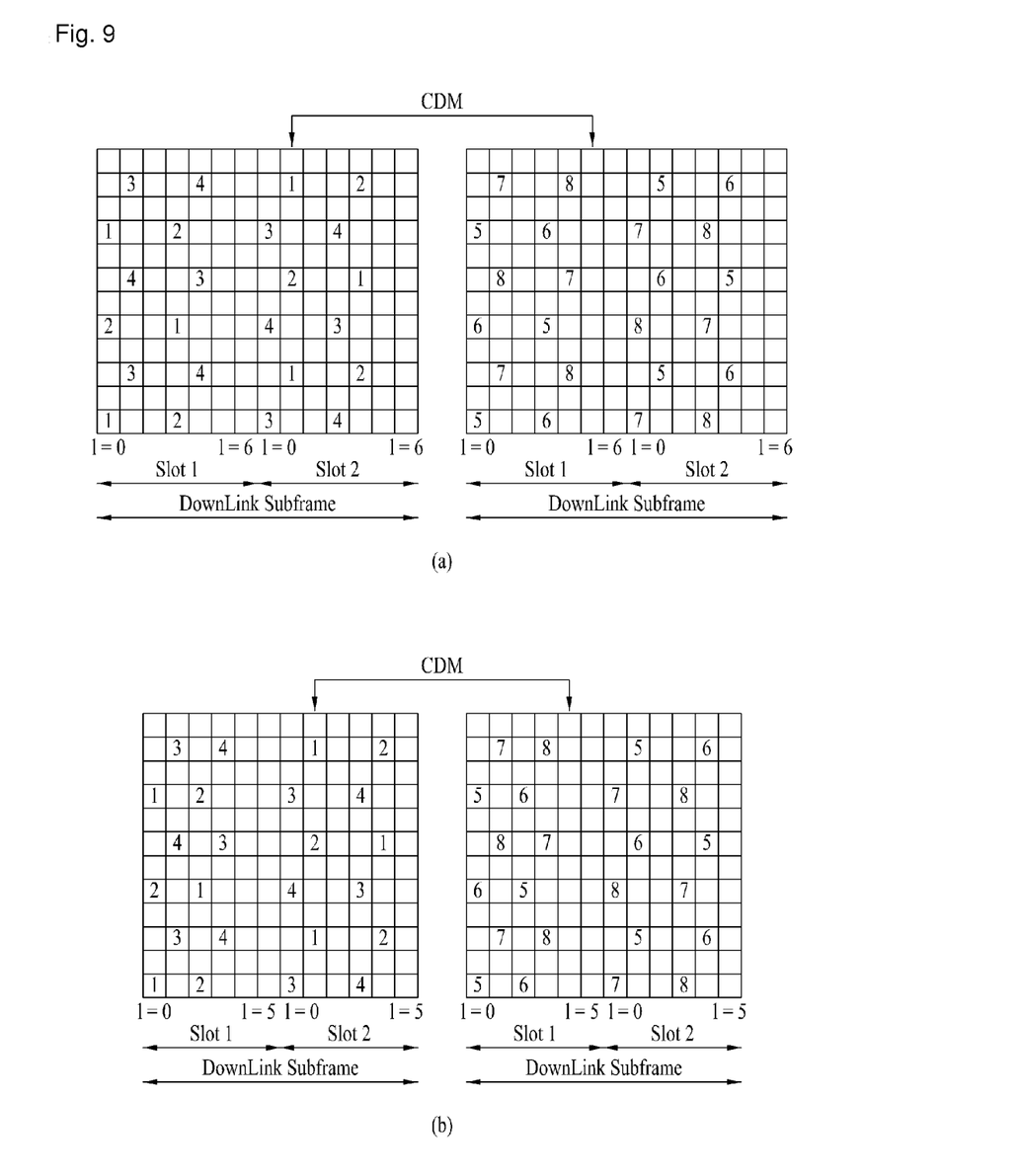
FIG. 9(a) illustrates an RS allocation structure designed to solve a power boosting-related problem in the wireless communication system using the normal CP according to the exemplary embodiment of the present invention.
FIG. 9(b) illustrates an RS allocation structure designed to solve a power boosting-related problem in the wireless communication system using the extended CP according to the exemplary embodiment of the present invention.

With reference to FIGS. 8 and 9, a method for transmitting downlink RSs in a wireless communication system according to an exemplary embodiment of the present invention will first be described.

In accordance with the exemplary embodiment, an eNB transmits CRSs for a plurality of Tx antenna ports in CDM. These CRSs may be used for channel measurement and demodulation.

FIG. 8(*a*) illustrates a subframe in which RSs are allocated in a wireless communication system using the normal CP according to the exemplary embodiment of the present invention, and FIG. 8(*b*) illustrates a subframe in which RSs are allocated in a wireless communication system using the extended CP according to the exemplary embodiment of the present invention.

Referring to FIG. 8(*a*), RSs for first to fourth Tx antenna ports are allocated every other subcarrier and RSs for fifth to eighth Tx antenna ports are allocated every other subcarrier, in a first OFDM symbol(1=0) of a first slot (Slot 1). Characteristically, the RSs for the first to fourth Tx antenna ports are CDM-multiplexed with the RSs for the fifth to eighth Tx antennas by twos, that is, antenna port pairing.

Specifically, in the first OFDM symbol (1=0) of Slot 1, RSs for the first and fifth Tx antenna ports are allocated in CDM to a first subcarrier, RSs for the third and seventh Tx antenna ports are allocated in CDM to a third subcarrier, RSs for the second and sixth Tx antenna ports are allocated in CDM to a fifth subcarrier, and RSs for the fourth and eighth Tx antenna ports are allocated in CDM to a seventh subcarrier.

In this exemplary embodiment, the first and fifth Tx antenna ports, the second and sixth Tx antenna ports, the third and seventh Tx antenna ports, and the fourth and eight Tx antenna ports are paired, to which the present invention is not limited. The antenna port pairing may be changed.

In FIG. 8(*a*), the RS pattern of the first OFDM symbol also appears in a fifth OFDM symbol, shifted by four subcarriers in Slot 1.

The RS pattern of Slot 1 repeats itself in Slot 2, shifted by two subcarriers along the frequency axis, in a staggered fashion. That is, RSs for a Tx antenna port has a subcarrier spacing of 8 from the perspective of a symbol, but a subcarrier spacing of 2 from the perspective of a subframe.

When the RSs for the first Tx antenna group and the RSs for the second Tx antenna group both have a subcarrier spacing of 2 along the frequency axis, a channel delay spread may be covered even when the RSs for the first Tx antenna group and the RSs for the second Tx antenna group are CDM-multiplexed. For example, since an expected maximum channel delay spread is 16.67-s and the duration of an OFDM symbol is 66.67-s in the conventional LTE system, there is little interference between the signals, thus enabling signal recovery.

Referring to FIG. 8(*b*), the extended CP is used and thus one slot includes six OFDM symbols. Hence, the RSs positioned in the fifth OFDM symbol of each slot in FIG. 8(*a*) are allocated to the fourth OFDM symbol of each slot in FIG. 8(*b*).

However, half subcarriers of one OFDM symbol are occupied by RSs in the RS allocation structures illustrated in FIGS. 8(*a*) and 8(*b*). This may cause a problem during RS power boosting. Power boosting is to increase pilot power with power borrowed from data to enhance channel estimation performance. The allocation of RSs to half subcarriers of an OFDM symbol imposes a constraint on the RS power boosting. Consequently, the channel estimation performance is limited.

To avert this problem, RS allocation structures illustrated in FIGS. 9(*a*) and 9(*b*) are proposed.

FIG. 9(*a*) illustrates an RS allocation structure designed to solve the power boosting-related problem in the wireless communication system using the normal CP, and FIG. 9(*b*) illustrates an RS allocation structure designed to solve the power boosting-related problem in the wireless communication system using the extended CP.

Compared to the RS allocation structures illustrated in FIGS. 8(*a*) and 8(*b*) in which RSs for eight Tx antenna ports are allocated to one OFDM symbol, the RS allocation structures of FIGS. 9(*a*) and 9(*b*) are characterized in that only RSs for four Tx antenna ports are allocated to one OFDM symbol and RSs for the other four Tx antenna ports are allocated to an OFDM.

In this manner, the power boosting-related problem may be overcome, while the advantage of the RS allocation structures illustrated in FIGS. 8(*a*) and 8(*b*) is still taken.

As illustrated in FIGS. 8(*a*) to 9(*b*), the RSs for each Tx antenna port are allocated to six resource elements in each RB of a subframe in accordance with the exemplary embodiment of the present invention. Notably, the number of RSs for a Tx antenna port differs in OFDM symbols. For instance, while two RSs for the first Tx antenna port are allocated to the first OFDM symbol of Slot 1, one RS for the first Tx antenna port is allocated to the fifth or fourth OFDM symbol of Slot 1 depending on the channel delay spread circumstance.

The RS patterns illustrated in FIGS. 8(*a*) to 9(*b*) are illustrative in nature and may be modified such that the RS patterns are shifted along the time or frequency axis, RSs are allocated in other OFDM symbols, or antenna port pairing is changed.

A method for transmitting downlink RSs in a wireless communication system according to another exemplary embodiment of the present invention will be described with reference to FIG. 10.

This exemplary embodiment is characterized by transmission of CRSs for some of a plurality of Tx antenna ports and transmission of DRSs for the other Tx antenna ports from an eNB.

RSs may serve the purposes of channel estimation and demodulation. One RS may be used for both channel measurement and demodulation or RSs may be separately transmitted to serve the respective purposes of channel measurement and demodulation. Typically, RSs for demodulation (DM-RSs) should be transmitted more frequently than RSs for channel measurement. In this context, this exemplary embodiment provides a method for transmitting DM-RSs. Meanwhile, RSs for channel measurement may be transmitted in any other way. For example, the RSs for channel measurement may be transmitted according to the afore-described exemplary embodiment of the present invention illustrated in FIGS. 8(*a*) to 9(*b*).

Although a rank of up to 8 can be supported for eight Tx antenna ports, the rank may be less than 8 according to a channel environment. However, if RSs for the eight Tx antenna ports are all CRSs in case of a small rank, the transmission of unnecessary RSs results in inefficient use of radio resources.

In this exemplary embodiment, therefore, if the rank is 4 or below, RSs for four Tx antenna ports are transmitted as CRSs. In contrast, if the rank is larger than 4, RSs for four Tx antenna ports are CRSs and RSs for the other Tx antenna ports are DRSs.

Figure 10:
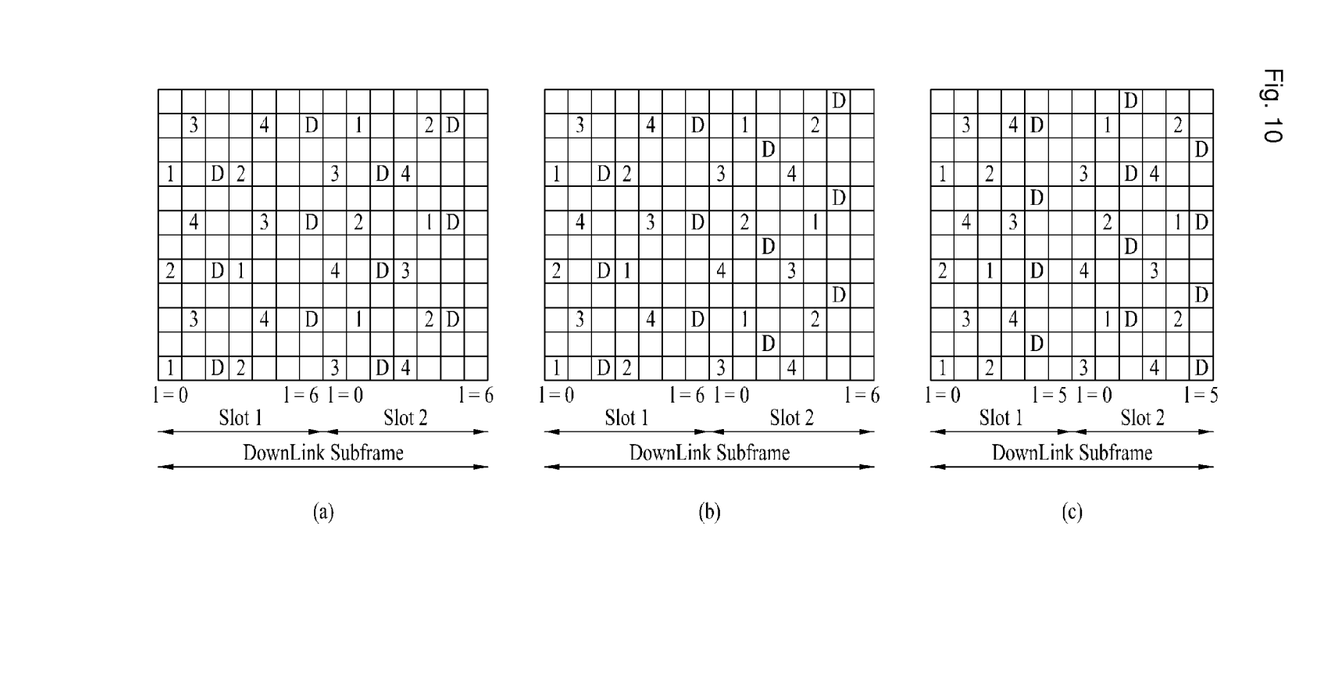
FIGS. 10(a) and 10(b) illustrate subframes in which RSs are allocated in the wireless communication system using the normal CP according to another exemplary embodiment of the present invention.
FIG. 10(c) illustrates a subframe in which RSs are allocated in the wireless communication system using the extended CP according to the second exemplary embodiment of the present invention.

FIGS. 10(*a*) and 10(*b*) illustrate subframes in which RSs are allocated in the wireless communication system using the normal CP according to the second exemplary embodiment of the present invention and FIG. 10(*c*) illustrates a subframe in which RSs are allocated in the wireless communication system using the extended CP according to the second exemplary embodiment of the present invention.

In FIGS. 10(*a*), 10(*b*) and 10(*c*), reference character D denotes resource elements to which DM-DRSs for the fifth to eighth Tx antenna ports are allocated in CDM. The DM-DRSs for the fifth to eighth Tx antenna ports may be PDM-DRSs or NDN-DRSs. If PDM-DRSs are used, radio resources may be more efficiently used.

Referring to FIGS. 10(a), 10(b) and 10(c), RSs for the first to fourth Tx antenna ports are allocated in a predetermined order along the frequency axis, and the RSs for the fifth to eighth antenna ports are allocated in CDM. The RSs for the first to fourth Tx antenna ports are CRSs, whereas the RSs for the fifth to eighth Tx antenna ports are DM-DRSs.

In FIG. 10(b), RSs for the fifth to eighth Tx antenna ports in Slot 2 is a one-subcarrier shift of RSs for the fifth to eighth Tx antenna ports in Slot 1.

The RSs for each of the fifth to eight Tx antenna ports has a spacing of two subcarriers in a subframe in FIG. 10(a). Thus, despite CDM of RSs for four Tx antenna ports, demodulation is possible without performance degradation in the wireless communication system using the normal CP. On the other hand, since the RSs for each of the fifth to eight Tx antenna ports has a spacing of one subcarrier in a subframe in FIGS. 10(b) and 10(c), demodulation is possible without performance degradation despite CDM of RSs for the four Tx antenna ports in the wireless communication system using the extended CP.

The RS patterns of FIGS. 10(a), 10(b) and 10(c) are applicable even when it is applied to dual stream beamforming. The dual stream beamforming is to transmit PDM-DRSs through two antenna ports. In this case, RSs for the two Tx antenna ports are allocated in CDM to the resource elements indicated by reference character D in FIGS. 10(a), 10(b) and 10(c), for the dual stream beamforming.

Figure 11:
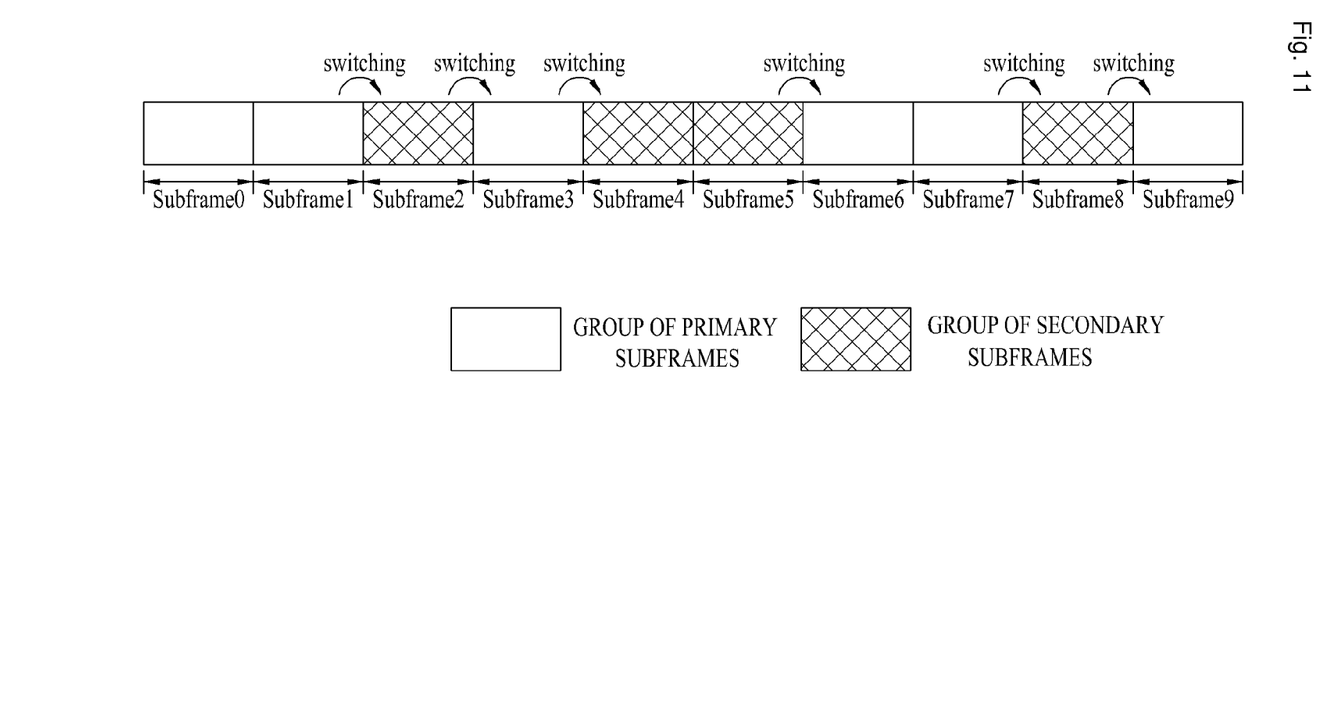
FIG. 11 illustrates a subframe in which Common Reference Signals (CRSs) are transmitted in Time Division Multiplexing (TDM) according to a third exemplary embodiment of the present invention.
Figure 12:
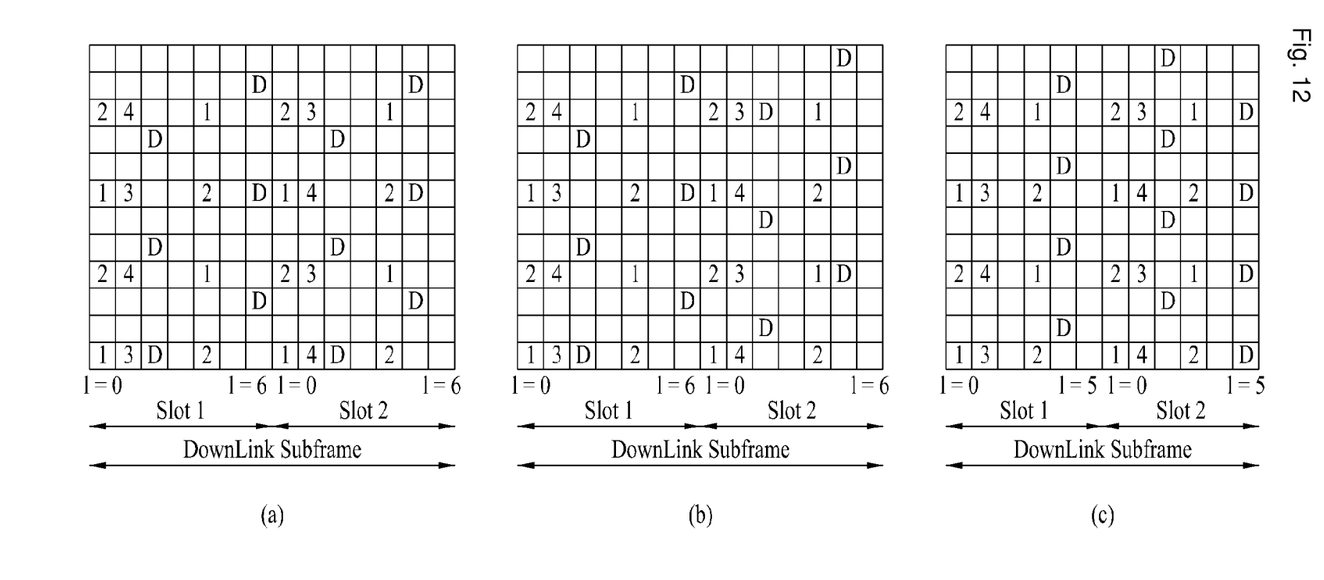
FIGS. 12(a) and 12(b) illustrate primary subframes in which RSs are allocated in the wireless communication system using the normal CP according to the third exemplary embodiment of the present invention.
FIG. 12(c) illustrates a primary subframe in which RSs are allocated in the wireless communication system using the extended CP according to the third exemplary embodiment of the present invention.

With reference to FIGS. 10, 11 and 12, a description will be made of a method for transmitting downlink RSs in a wireless communication system according to a third exemplary embodiment of the present invention.

FIG. 11 illustrates a subframe in which CRSs are transmitted in TDM according to the third exemplary embodiment of the present invention, FIGS. 12(a) and 12(b) illustrate primary subframes in which RSs are allocated in the wireless communication system using the normal CP according to the third exemplary embodiment of the present invention, and FIG. 12(c) illustrates a primary subframe in which RSs are allocated in the wireless communication system using the extended CP according to the third exemplary embodiment of the present invention.

Referring to FIG. 11, primary and secondary subframes are switched to each other during transmission in the third exemplary embodiment of the present invention. For example, the primary subframe is accessible to both an LTE UE and an LTE-A UE, whereas the secondary subframe is accessible only to an LTE-A UE. The secondary subframe may be a Multicast Broadcast Single Frequency Network (MBSFN) subframe. When an eNB notifies an LTE UE of an MBSFN subframe by signaling, the LTE UE does not read the data part of the MBSFN subframe in the LTE system.

CRSs for the first to fourth Tx antenna ports and DM-DRSs for the fifth to eighth Tx antenna ports are allocated to the primary subframe, whereas CRSs for the fifth to eight Tx antenna ports and DM-DRSs for the first to fourth Tx antenna ports are allocated to the secondary subframe. The DM-DRSs may be PDM-DRSs or NDM-DRSs. When PDM-DRSs are used, radio resources may be utilized more efficiently.

The primary frame will be described with reference to FIG. 12.

In FIGS. 12(a), 12(b) and 12(c), reference character D denotes resource elements to which DM-DRSs for the fifth to eighth Tx antenna ports are allocated in CDM.

Referring to FIGS. 12(a), 12(b) and 12(c), CRSs for the first to fourth Tx antenna ports are allocated in a predetermined order along the frequency axis, and DM-DRSs for the fifth to eighth Tx antenna ports are allocated in CDM.

In FIG. 12(b), the DM-DRSs for the fifth to eighth Tx antenna ports in Slot 2 are a one-subcarrier shift of the DM-DRSs for the fifth to eighth Tx antenna ports in Slot 1.

The DM-DRSs for each of the fifth to eight Tx antenna ports has a spacing of two subcarriers in a subframe in FIG. 12(a). Thus despite CDM of RSs for four Tx antenna ports, demodulation is possible without performance degradation in the wireless communication system using the normal CP. On the other hand, since the RSs for each of the fifth to eight Tx antenna ports has a spacing of one subcarrier in a subframe in FIG. 12(c), demodulation is possible without performance degradation despite the CDM of RSs for the four Tx antenna ports in the wireless communication system using the extended CP.

The positions of the CRSs for the first to fourth Tx antenna ports may be changed in FIGS. 12(a), 12(b) and 12(c). For example, the CRSs for the first to fourth Tx antenna ports may be positioned as illustrated in FIGS. 10(a), 10(b) and 10(c). In other words, the subframes illustrated in FIGS. 10(a), 10(b) and 10(c) may be configured as primary subframes according to the third exemplary embodiment of the present invention.

If a rank is 4 or below, channel measurement and demodulation may be carried out with the RSs for the first to fourth Tx antenna ports. Hence, only the RSs for the first to fourth Tx antenna ports may be transmitted without the RSs for the fifth to eighth Tx antenna ports denoted by reference character D in FIGS. 10(a), 10(b) and 10(c) and FIGS. 12(a), 12(b) and 12(c). For example, the LTE system supports four Tx antenna ports and the LTE-A system supports eight Tx antenna ports. If a rank is 4 or below, an eNB may transmit only RSs for the first to fourth Tx antenna ports to an LTE-A UE in a downlink subframe and it may use the same codebook as in the LTE system. However, just in case the rank is 5 or above, DM-DRSs for the fifth to eight Tx antenna ports may be transmitted, for the convenience' sake of system implementation.

If the rank is 5 or above, the RSs for the first to fourth Tx antenna ports are transmitted as CRSs and the RSs for the fifth to eighth Tx antenna ports are transmitted as DM-DRSs as illustrated in FIGS. 10(a), 10(b) and 10(c) and FIGS. 12(a), 12(b) and 12(c).

In the secondary frame, the RSs for the fifth to eight Tx antenna ports are CRSs, whereas the RSs for the first to fourth Tx antenna ports are DM-DRSs. To be more specific, the CRSs for the fifth to eight Tx antenna ports are allocated to the resource elements that carry the CRSs for the first to fourth Tx antenna ports in FIGS. 10(a), 10(b) and 10(c) and FIGS. 12(a), 12(b) and 12(c), and the DM-DRSs for the first to fourth Tx antenna ports are allocated in CDM to the resource elements that are indicated by reference character D10(a), 10(b) and 10(c) and FIGS. 12(a), 12(b) and 12(c).

In case of a rank of 4 or below, because the CRSs allocated to the secondary subframe are the RSs for the fifth to eighth Tx antenna ports, the DM-DRSs for the first to fourth Tx antenna ports are transmitted in CDM. Then there is no need for considering the RSs for the fifth to eighth Tx antenna ports, and thus the codebook of the LTE system may still be used.

In case of a rank of 5 or above, the CRSs for the fifth to eighth Tx antenna ports are used for demodulation and the DM-DRSs for the first to fourth Tx antenna ports are transmitted in CDM in the secondary subframe.

The RS patterns illustrated in FIGS. 12(a) and 12(c) may be used without subframe switching. To be specific, only the primary subframe may be used without switching between the primary and secondary subframes.

The RS patterns of FIGS. 12(a), 12(b) and 12(c) are applicable even when it is applied to dual stream beamforming. The dual stream beamforming is to transmit PDM-DRSs through two antenna ports. In this case, RSs for the two Tx antenna ports are allocated in CDM to the resource elements indicated by reference character D, for the dual stream beamforming.

Figure 13:
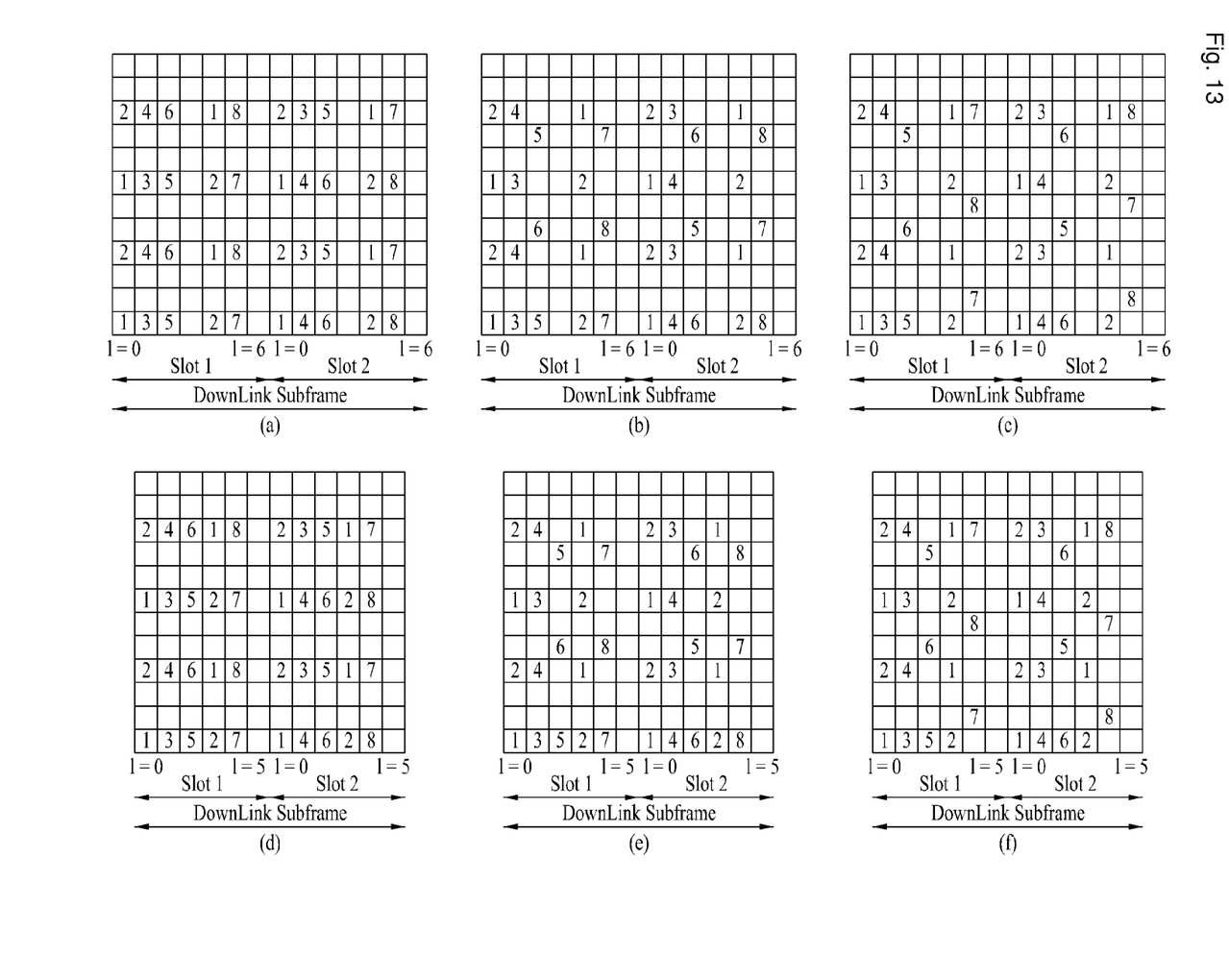
FIGS. 13(a), 13(b) and 13(c) illustrate primary subframes in which RSs are allocated in the wireless communication system using the normal CP according to a fourth exemplary embodiment of the present invention.
FIGS. 13(d), 13(e) and 13(f) illustrate primary subframes in which RSs are allocated in the wireless communication system using the extended CP according to the fourth exemplary embodiment of the present invention.

With reference to FIG. 13, a description will be made of a method for transmitting downlink RSs in a wireless communication system according to a fourth exemplary embodiment of the present invention.

FIGS. 13(a), 13(b) and 13(c) illustrate primary subframes in which RSs are allocated in the wireless communication system using the normal CP according to the fourth exemplary embodiment of the present invention, and FIGS. 13(d), 13(e) and 13(f) illustrate primary subframes in which RSs are allocated in the wireless communication system using the extended CP according to the fourth exemplary embodiment of the present invention.

In accordance with the fourth exemplary embodiment of the present invention, an eNB switches between a primary subframe accessible to all UEs and a secondary subframe accessible only to a specific UE. CRSs for the first to fourth Tx antenna ports and FDM-multiplexed DM-DRSs for the fifth to eighth Tx antenna ports are allocated in the primary subframe, whereas CRSs for the fifth to eighth Tx antenna ports and FDM-multiplexed DM-DRSs for the first to fourth Tx antenna ports are allocated in the secondary subframe. The CRSs for the first to fourth Tx antenna ports allocated to the primary subframe and the CRSs for the fifth to eighth Tx antenna ports allocated to the secondary subframe may be used for channel measurement and demodulation.

The primary subframe will be described with reference to FIGS. 13(a) to 13(f).

Referring to FIGS. 13(a) to 13(f), the RSs for the first to fourth Tx antenna ports are CRSs and the RSs for the fifth to eighth Tx antenna ports are DM-DRSs that are multiplexed in FDM.

In FIGS. 13(a) and 13(d), the first and second Tx antenna ports each have eight RSs, and each of the third to eighth Tx antenna ports has four RSs, per RB in a subframe.

For instance, the LTE system regulates that the numbers of RSs for the first to fourth antenna ports are respectively 8, 8, 4 and 4 per RB in a subframe. If the number of RSs for each of the fifth to eighth Tx antenna ports is set to be 4 with a predetermined frequency spacing between RSs, the hardware of the LTE system may still be used without any modification.

However, radio resources may be used more efficiently by reducing the numbers of RSs for the fifth to eighth Tx antenna ports. In FIGS. 13(b), 13(c), 13(e) and 13(f), each of the fifth to eighth Tx antennas has three RSs per RB in a subframe. Because the RSs for the fifth to eighth Tx antennas have a spacing of four subcarriers, demodulation is possible without performance degradation in the wireless communication system using the extended CP.

The RSs for the fifth to eighth Tx antenna ports are distributed along the frequency axis in FIGS. 13(c) and 13(f), relative to FIGS. 13(b) and 13(e).

The RS patterns illustrated in FIGS. 13(a) to 13(f) are illustrative in nature and may be modified such that the RS patterns are shifted along the time or frequency axis or RSs are allocated in other OFDM symbols.

In case of a rank of 4 or below, because channel measurement and demodulation can be performed with the RSs for the first to fourth Tx antenna ports. Hence, only the RSs for the first to fourth Tx antenna ports may be transmitted without the RSs for the fifth to eighth Tx antennas in FIGS. 13(a) to 13(f). For example, in case of a rank of 4 or below, an eNB may transmit only RSs for the first to fourth Tx antennas even to an LTE-A UE in a downlink subframe and it may use the same codebook as in the LTE system. However, just in case the rank is 5 or above, DM-DRSs for the fifth to eight Tx antenna ports may be transmitted, for the convenience' sake of system implementation.

If the rank is 5 or above, the RSs for the first to fourth Tx antenna ports are transmitted as CRSs and the RSs for the fifth to eighth Tx antenna ports are transmitted as DM-DRSs as illustrated in FIGS. 13(a) to 13(f).

In the secondary frame, the RSs for the fifth to eight Tx antenna ports are CRSs, whereas the RSs for the first to fourth Tx antenna ports are FDM-multiplexed DM-DRSs. To be more specific, the CRSs for the fifth to eight Tx antenna ports are allocated to the resource elements that carry the CRSs for the first to fourth Tx antenna ports in the primary subframe, and the DM-DRSs for the first to fourth Tx antenna ports are allocated in FDM to the resource elements that carry the DM-DRSs for the fifth to eight Tx antenna ports in the primary subframe.

In case of a rank of 4 or below, because the CRSs allocated to the secondary subframe are the RSs for the fifth to eighth Tx antenna ports, the DM-DRSs for the first to fourth Tx antenna ports are transmitted in FDM. Then there is no need for considering the RSs for the fifth to eighth Tx antenna ports, and thus the codebook of the LTE system may still be used.

In case of a rank of 5 or above, the CRSs for the fifth to eighth Tx antenna ports are used for demodulation and the DM-DRSs for the first to fourth Tx antenna ports are transmitted in FDM in the secondary subframe.

Figure 14:
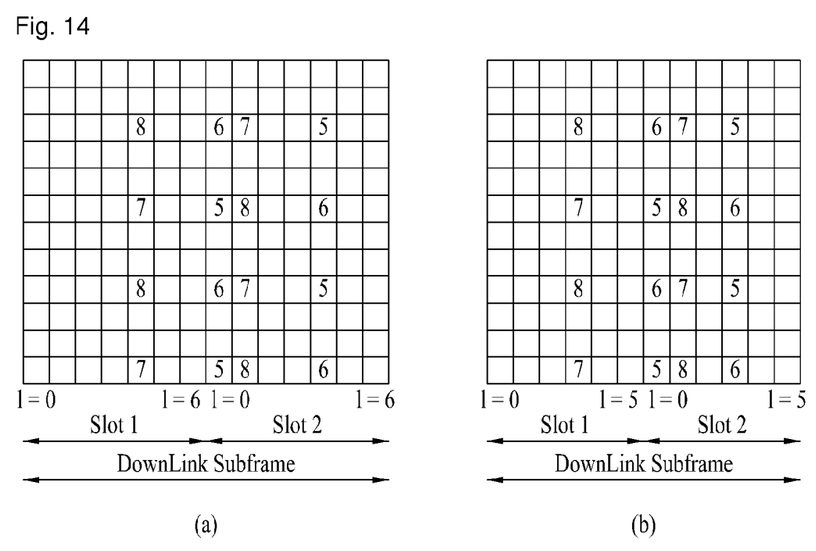
FIG. 14 illustrates a CRS allocation structure taking into account the limit of the numbers of RSs.

In the fourth exemplary embodiment of the present invention, the CRSs for the fifth to eighth Tx antenna ports may be positioned in the secondary subframe as illustrated in FIG. 14. FIG. 14 illustrates a CRS allocation structure taking into account the limit of the numbers of RSs.

As the numbers of RSs for the first to fourth Tx antenna ports are limited to 8, 8, 4 and 4, respectively in the LTE system, each of the fifth to eighth Tx antenna ports may be restricted to four RSs in the LTE-A system. Table 2 lists the numbers of RSs for the respective Tx antenna ports, when each of the fifth to eighth Tx antenna ports is restricted to four RSs.

TABLE 2

| | Antenna port | | | | | | | |
|---|---|---|---|---|---|---|---|---|
| | 1 | 2 | 3 | 4 | 5 | 6 | 7 | 8 |
| Number of RSs | 8 | 8 | 4 | 4 | 4 | 4 | 4 | 4 |

As more RSs are used, channel estimation is more accurate. However, limiting the numbers of RSs makes it possible to efficiently use radio resources. Thus, as illustrated in FIGS. 14(a) and 14(b), four RSs may be allocated to the secondary frame, for each of the fifth to eighth Tx antenna ports. If the secondary subframe is an MBSFN subframe in the LTE system, a UE identifies that the secondary subframe is an MBSFN subframe by reading the first and second OFDM symbols of the secondary subframe and thus does not read the following data part. That's why the CRSs for the fifth to eighth Tx antenna ports are not positioned in the first and second OFDM symbols of the secondary subframe in FIGS. 14(a) and 14(b).

Figure 15:
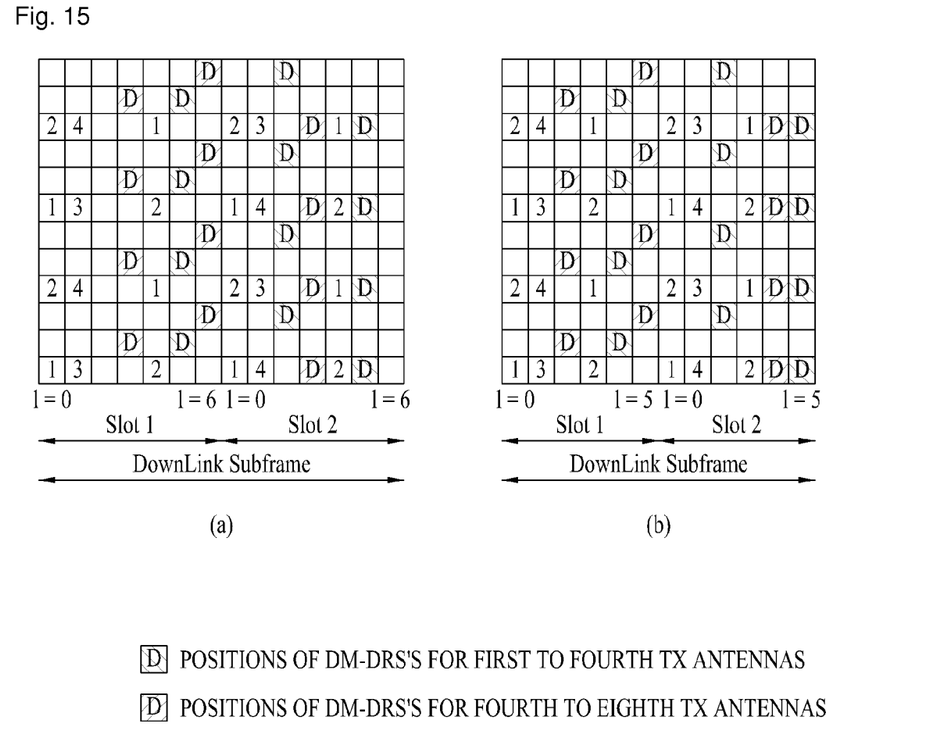
FIG. 15(a) illustrates a primary subframe in which RSs are allocated in the wireless communication system using the normal CP according to a fifth exemplary embodiment of the present invention.
FIG. 15(b) illustrates a primary subframe in which RSs are allocated in the wireless communication system using the extended CP according to the fifth exemplary embodiment of the present invention.

A method for transmitting downlink RSs in a wireless communication system according to a fifth exemplary embodiment of the present invention will be described below with reference to FIG. 15.

FIG. 15(a) illustrates a primary subframe in which RSs are allocated in the wireless communication system using the normal CP according to the fifth exemplary embodiment of the present invention, and FIG. 15(b) illustrates a primary subframe in which RSs are allocated in the wireless communication system using the extended CP according to the fifth exemplary embodiment of the present invention.

In accordance with the fifth exemplary embodiment of the present invention, a primary subframe accessible to all UEs and a secondary subframe accessible only to a specific UE are switched to each other during transmission. CRSs for the first to fourth Tx antenna ports and DM-DRSs for the first to eighth Tx antenna ports are allocated in the primary subframe, whereas CRSs for the fifth to eighth Tx antenna ports and DM-DRSs for the first to eighth Tx antenna ports are allocated in the secondary subframe. The DM-DRSs for the first to fourth Tx antenna ports are CDM-multiplexed and the DM-DRSs for the fifth to eighth Tx antenna ports are CDM-multiplexed in the primary and secondary subframes.

FIGS. 15(a) and 15(b) illustrate primary subframes according to the fifth exemplary embodiment of the present invention. In a secondary subframe, the CRSs for the fifth to eighth Tx antenna ports are allocated to the positions at which the CRSs for the first to fourth Tx antenna ports are allocated in a primary subframe.

The RS patterns as illustrated in FIGS. 15(a) and 15(b) are illustrative in nature and may be modified such that the RS patterns are shifted along the time or frequency axis or RSs are allocated in other OFDM symbols.

The RS patterns illustrated in FIGS. 15(a) and 15(b) may be used without subframe switching. To be specific, only the primary subframe may be used without switching between the primary and secondary subframes.

Mode for the Invention

Various embodiments have been described in the best mode for carrying out the invention.

INDUSTRIAL APPLICABILITY

The present invention is applicable to a method for conducting communication in a wireless communication system. More particularly, the present invention is applicable to a method for transmitting and receiving downlink RSs in a wireless communication system having multiple antennas.

The exemplary embodiments of the present invention may be achieved by various means, for example, hardware, firmware, software, or a combination thereof.

In a hardware configuration, the methods for transmitting and receiving downlink RSs according to the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods for transmitting and receiving downlink RSs according to the exemplary embodiments of the present invention may be implemented in the form of a module, a procedure, a function, etc. performing the above-described functions or operations.

A software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Also, it is obvious to those skilled in the art that claims that are not explicitly cited in each other in the appended claims may be presented in combination as an exemplary embodiment of the present invention or included as a new claim by a subsequent amendment after the application is filed.

The invention claimed is:

1. A method for transmitting downlink Reference Signals (RSs) wireless communication system, the method performed by a base station having a plurality of antenna ports and comprising:
   transmitting, by the base station, a first Orthogonal Frequency Division Multiplexing (OFDM) symbol in which first RSs and second RSs are allocated in a predetermined order along a frequency axis, the first RSs for a plurality of a first group of antenna ports among the plurality of antenna ports, the second RSs for a second group of antenna ports among the plurality of antenna ports, and the first RSs multiplexed in Code Division Multiplexing (CDM) with the second RSs by pairing each of the first group of antenna ports with one of the second group of antenna ports; and
   transmitting, by the base station, a second OFDM symbol in which the first RSs and the second RSs are positioned in an RS pattern that is a frequency-domain shift of an RS pattern of the first OFDM symbol.

2. The method according to claim 1, wherein:
   the first and second OFDM symbols are included in one subframe; and
   a number of the first RSs and a number of the second RSs are the same.

3. The method according to claim 1, wherein:
   the first group of antenna ports include first, second, third and fourth antenna ports;
   the second group of antenna ports include fifth, sixth, seventh and eighth antenna ports; and
   the first and the second RSs for the first to eighth antenna ports are allocated to a subframe according to the following pattern:

| Antenna | | 1 | 2 | 3 | 4 | 5 | 6 | 7 | 8 |
|---|---|---|---|---|---|---|---|---|---|
| 1st slot | (l, m) | (0, 0) | (0, 4) | (0, 2) | (0, 6) | (0, 0) | (0, 4) | (0, 2) | (0, 6) |
|  | (l, m) | (0, 8) | (4, 0) | (0,10) | (4, 2) | (0, 8) | (4, 0) | (0,10) | (4, 2) |
|  | (l, m) | (4, 4) | (4, 8) | (4, 6) | (4,10) | (4, 4) | (4, 8) | (4, 6) | (4,10) |
| 2nd slot | (l, m) | (0, 2) | (0, 6) | (0, 0) | (0, 4) | (0, 2) | (0, 6) | (0, 0) | (0, 4) |
|  | (l, m) | (0,10) | (4, 2) | (0, 8) | (4, 0) | (0,10) | (4, 2) | (0, 8) | (4, 0) |
|  | (l, m) | (4, 6) | (4,10) | (4, 4) | (4, 8) | (4, 6) | (4,10) | (4, 4) | (4, 8), | wherein each of the first and second slots in the pattern includes seven OFDM symbols along a time axis and 12 subcarriers along the frequency axis,
   wherein l corresponds to an OFDM symbol index, and
   wherein m corresponds to a subcarrier index.

4. The method according to claim 1, wherein the first RSs are used for channel measurements of the first group of antenna ports and the second RSs are used for channel measurements of the second group of antenna ports and the method further comprises:

transmitting, by the base station, a third Orthogonal Frequency Division Multiplexing (OFDM) symbol in which demodulation RSs for the first group of antenna ports are allocated in a predetermined order along the frequency axis; and     transmitting, by the base station, a fourth OFDM symbol in which demodulation RSs for the second group of antenna ports are allocated in CDM.

5. The method according to claim 4, wherein the demodulation RSs for the first group of antenna ports and the demodulation RSs for the second group of antenna ports are demodulation-dedicated RSs used for dual stream beamforming between the first group of antenna ports and the second croup of antenna ports.

\* \* \* \* \*